(12) United States Patent
Hohmann et al.

(10) Patent No.: US 10,720,268 B2
(45) Date of Patent: Jul. 21, 2020

(54) METHOD OF MAKING A SHEATH FOR AN ELONGATED OBJECT

(71) Applicants: Andreas Franz Hohmann, Wuppertal (DE); Timo Leermann, Wuppertal (DE); Kay Ruhnau, Wuppertal (DE); Peter Rambusch, Wuppertal (DE)

(72) Inventors: Andreas Franz Hohmann, Wuppertal (DE); Timo Leermann, Wuppertal (DE); Kay Ruhnau, Wuppertal (DE); Peter Rambusch, Wuppertal (DE)

(73) Assignee: CERTOPLAST TECHNISCHE KLEBEBAENDER GMBH, Wuppertal (DE)

( * ) Notice: Subject to any disclaimer, the term of this patent is extended or adjusted under 35 U.S.C. 154(b) by 0 days.

(21) Appl. No.: 16/510,910

(22) Filed: Jul. 13, 2019

(65) Prior Publication Data

US 2019/0341175 A1    Nov. 7, 2019

Related U.S. Application Data

(62) Division of application No. 15/505,369, filed on Feb. 21, 2017, now Pat. No. 10,395,803.

(51) Int. Cl.
*H01B 13/26* (2006.01)
*B32B 29/02* (2006.01)
(Continued)

(52) U.S. Cl.
CPC .............. *H01B 13/26* (2013.01); *B32B 5/02* (2013.01); *B32B 5/022* (2013.01); *B32B 5/024* (2013.01); *B32B 5/24* (2013.01); *B32B 5/26* (2013.01); *B32B 7/05* (2019.01); *B32B 7/12* (2013.01); *B32B 15/04* (2013.01); *B32B 15/08* (2013.01); *B32B 15/12* (2013.01); *B32B 15/14* (2013.01); *B32B 27/06* (2013.01); *B32B 27/08* (2013.01); *B32B 27/10* (2013.01); *B32B 27/283* (2013.01); *B32B 27/285* (2013.01); *B32B 27/308* (2013.01); *B32B 27/40* (2013.01); *B32B 29/002* (2013.01); *B32B 29/02* (2013.01); *B32B 37/12* (2013.01); *C09J 5/04* (2013.01); *C09J 7/29* (2018.01); *H01B 7/2825* (2013.01); *H02G 3/0481* (2013.01); *B32B 2262/0261* (2013.01); *B32B 2262/0276* (2013.01); *B32B 2307/304* (2013.01); *B32B 2405/00* (2013.01); *B32B 2457/00* (2013.01); *B60R 16/0207* (2013.01); *C09J 7/21* (2018.01); *C09J 2201/128* (2013.01); *C09J 2201/28* (2013.01); *C09J 2201/61* (2013.01); *C09J 2203/302* (2013.01);
(Continued)

(58) Field of Classification Search
CPC .......... C09J 2203/302; C09J 7/21; C09J 7/29; H01B 7/2825; H01B 13/26
See application file for complete search history.

(56) References Cited

U.S. PATENT DOCUMENTS 6,936,553 B2 * 8/2005 Von Samson-Himmelstjerna ....... H02G 3/0481
442/149
7,282,250 B2 * 10/2007 Musahl .................. H01B 7/186
428/43

* cited by examiner

*Primary Examiner* — Carson Gross
(74) *Attorney, Agent, or Firm* — Andrew Wilford

(57) ABSTRACT

A sheath for wrapping an elongated object is formed by an adhesive tape having a base strip having inner and outer faces, a first adhesive on the outer face, an adhesive-free overlay strip adhered to the first adhesive coating so as to leave a first exposed edge band on at least one of two longitudinal edges of the tape, and a second adhesive layer covering only part of an area of the inner face.

10 Claims, 1 Drawing Sheet

(51) Int. Cl.
*B32B 5/02* (2006.01)
*B32B 5/24* (2006.01)
*B32B 5/26* (2006.01)
*B32B 15/04* (2006.01)
*B32B 15/08* (2006.01)
*B32B 15/12* (2006.01)
*B32B 15/14* (2006.01)
*B32B 27/06* (2006.01)
*B32B 27/08* (2006.01)
*B32B 27/10* (2006.01)
*B32B 27/28* (2006.01)
*B32B 27/30* (2006.01)
*B32B 27/40* (2006.01)
*B32B 29/00* (2006.01)
*B32B 17/12* (2006.01)
*C09J 7/29* (2018.01)
*B32B 7/05* (2019.01)
*H01B 7/282* (2006.01)
*B32B 37/12* (2006.01)
*B32B 7/12* (2006.01)
*H02G 3/04* (2006.01)
*C09J 5/04* (2006.01)
*B60R 16/02* (2006.01)
*C09J 7/21* (2018.01)

(52) U.S. Cl.
CPC .... *C09J 2400/163* (2013.01); *C09J 2400/263* (2013.01); *C09J 2433/00* (2013.01); *C09J 2467/006* (2013.01); *C09J 2477/006* (2013.01); *Y10T 156/103* (2015.01); *Y10T 156/1008* (2015.01); *Y10T 156/1013* (2015.01); *Y10T 156/1033* (2015.01)

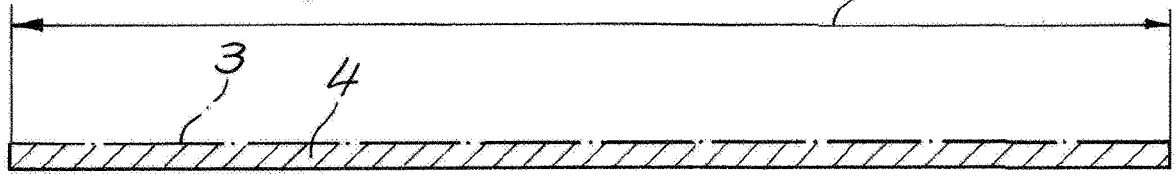
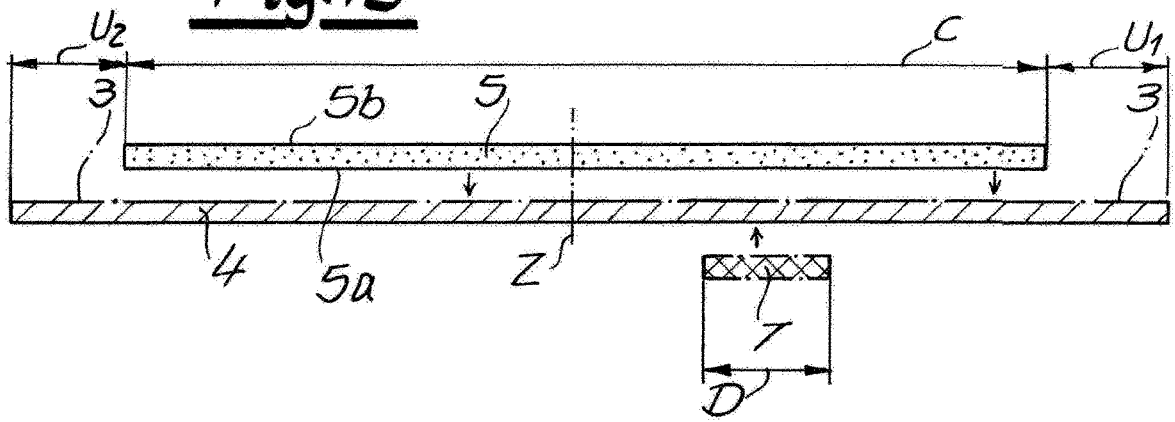
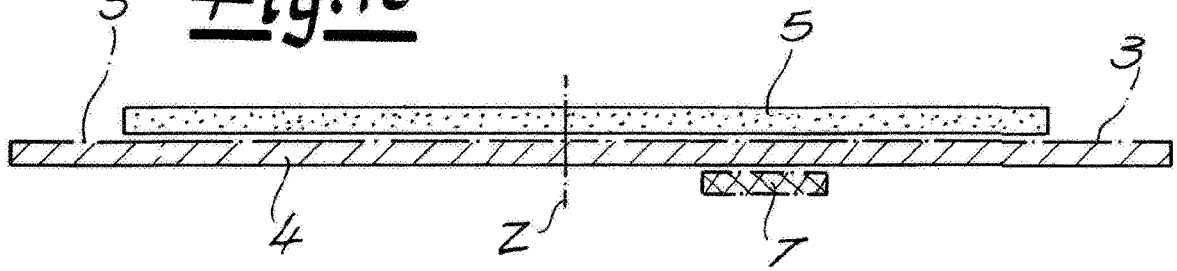
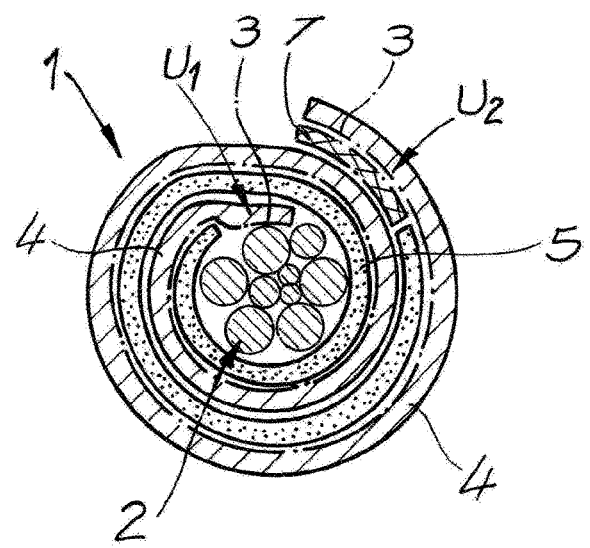

METHOD OF MAKING A SHEATH FOR AN ELONGATED OBJECT

CROSS REFERENCE TO RELATED APPLICATIONS

This application is a divisional application of U.S. patent application Ser. No. 15/505,369 filed 21 Feb. 2017 and now U.S. Pat. No. 10,395,803 issued 27 Aug. 2019 as the US-national stage of PCT application PCT/EP2015/069233 filed 21 Aug. 2015 and claiming the priority of German patent application 102014113769.8 itself filed 23 Sep. 2014.

FIELD OF THE INVENTION

The invention relates to a method of making a wrap for an elongated object, in particular a sheath for cable sets, according to which adhesive tape consisting of a base strip and a first adhesive coating that essentially covers the full area of the base strip on its outer face is combined with an adhesive-free overlay strip to form a laminate.

BACKGROUND OF THE INVENTION

Such a wrap is made by applying the adhesive tape with its first adhesive coating to the overlay strip along at least one of its two longitudinal edges in such a way as to form a first exposed edge band.

The first adhesive coating covers the base strip on its outer face over essentially the full area. This means that the entire outer face is covered with the adhesive coating except for possibly recesses in the edge area, for example, or between individual strips. In other words, the invention includes not only continuous adhesive coatings on the outer face over the full area but instead in principle also includes a strip coating covering the outer face or even just a spot coating with the adhesive on the outer face.

On the other hand, the overlay strip is designed to be free of adhesive coating. In other words, the overlay strip is explicitly not adhesive tape because there is no adhesive coating. The overlay strip may likewise be furnished in principle with a non-adhesive coating, for example, a lacquer coating or the like.

The first adhesive coating of the adhesive tape is applied to the overlay strip for joining to the overlay strip. This leaves a first edge of the adhesive tape projecting past the overlay strip. Consequently, the adhesive coating of the adhesive tape is exposed outward at this first exposed edge band. As a rule, this adhesive coating functions as a fixation strip on the laminate for securing it on the elongated object, as will be explained in greater detail below.

In the prior art according to U.S. Pat. No. 4,327,246, the procedure is to ultimately make two adhesive tapes with a common base strip that is at least initially set up so as to be free of adhesive coating. To describe this in detail, the two adhesive tapes are each laminated to one another on the sticky face with an offset toward travel. To bundle the elongated object, the known laminate is aligned parallel to it and then is wound around the elongated object. At this point, it would also be possible in principle to wind in a spiral or helix.

The teaching according to EP 1 875 573 [U.S. Pat. No. 7,132,028] also belongs to the relevant prior art. In this case, a total of three adhesive tapes are used. Initially a first and a second adhesive tape provided with adhesive on one face are laminated to one another on the sticky face with an offset toward travel. A third adhesive tape provided with adhesive on one face is on the free edge of the first adhesive tape of the sheath and is in turn laminated onto the first adhesive tape on the sticky face with an offset in the direction of travel. The third adhesive tape here is arranged on the same face of the first adhesive tape as the second adhesive tape.

Therefore, this creates the possibility of bundling cable sets and achieving substantial protection from mechanical damage due to scouring and rubbing at sharp edges, burrs and spot welds. However, production here is expensive and complicated because the total of three adhesive tapes provided with adhesive on one face must be laminated to one another with an offset in a certain order of procedural steps. No corrections are possible with this procedure, so it may be necessary to work with protective films.

EP 1 312 097 [U.S. Pat. No. 7,282,250] relates to a mostly generic method. At this point, a textile cover flanked by an adhesive tape provided with a self-adhesive is provided in a narrow edge area. Furthermore, another second adhesive tape provided with a self-adhesive is also used. The two adhesive tapes extend along longitudinal edges of the cover. This should permit a simple, inexpensive and rapid wrapping. The cover itself is designed to be free of adhesive compound. However, at least two adhesive tapes provided with a self-adhesive compound are used again and obligatorily, their handling being complicated and full of problems in production of the laminate. This is where the invention intends to provide a remedy.

OBJECT OF THE INVENTION

The object of the invention is to develop such a method of making a wrap for an elongated object that production is simplified and cost reductions can be achieved on the whole.

SUMMARY OF THE INVENTION

To attain this object, a generic method is characterized within the scope of the present invention by the fact that the base strip of the adhesive tape is furnished essentially over a partial area with another second adhesive coating in addition to the first adhesive coating on its inner face.

The additional second adhesive coating over only part of the inner face of the base strip of the adhesive tape is usually not applied until the adhesive tape has been combined with the base strip. However, it is also fundamentally possible to provide both the first and second adhesive coatings on the base strip from the beginning and to combine the adhesive tape furnished in this way with the base strip to form the laminate as a whole.

As a rule, however, a self-stick adhesive tape that is used here already has the first adhesive coating on its outer face, but its inner face is initially free of adhesive. As soon as this adhesive tape that is provided with a self-stick adhesive has been combined with the base strip to form the laminate, the inner face of the base strip of the adhesive tape may also be provided with the additional second adhesive coating in a subsequent final step.

As already explained, the base strip of the adhesive tape is provided with the first adhesive coating on its outer face, essentially covering the outer face in question over its full area. However, the second adhesive coating provided on the inner face of the base strip ensures an adhesive coating over only part of its area. This means that the inner face of the base strip in question is only partly covered by the second adhesive coating, namely over part of its area. The relative term "essentially" expresses the fact that, in the same way as with the first adhesive coating, the second adhesive coating may also be designed in principle as a strip coating, a spot coating, etc., as long as the adhesive coating covers the inner face in question over only part of its area.

In this way, the invention avoids first the handling and processing of three adhesive tapes, each of which is provided with adhesive on one face and both of which must obligatorily be processed together according to the teaching of EP 1 875 573. There is instead only one (single) adhesive tape provided with adhesive on one face and combined with the base strip to form the laminate and then ultimately provided with the second adhesive coating over part of the area of its inner face. This eliminates any handling problems from the beginning. In contrast with the teaching according to EP 1 312 097, this also permits a simplification because, within the scope of the invention and according to an advantageous embodiment, a single adhesive tape comprised of the base strip and the adhesive coating on the outer face is combined with the overlay strip to form the laminate.

The overlay strip free of adhesive coating is typically a textile strip material. Basically a plastic film, a metal film, a paper film, a paper sheet or some other flat material can also be processed in this way. If the base strip material and/or the object for the overlay strip is/are designed as a textile strip, then any flat nonwoven materials, woven fabrics, knit fabrics, velour fabrics as well as felt layers and foam layers have proven to be advantageous. Since the inventive sheath for making a wrap of the elongated object is also used, certain additional properties can also be employed in the overlay strip, depending on the choice of materials.

The invention here starts from the discovery that the above-described overlay strip comes in direct physical contact with the elongated object during the sheath. In most cases contact of the overlay strip with the elongated object is observed over a length corresponding to at least half of a turn because the procedure followed when making the sheath is to wrap the sheath and/or the laminate longitudinally around the elongated object.

Due to the physical contact between the overlay strip and the elongated object during wrapping, it is advisable to make the overlay strip from a velour material or a foam, for example, when rattling noises may be expected from the elongated object or must be suppressed. Other functions of the overlay strip, such as absorbing moisture for example, are also possible, so that nonwoven materials are especially suitable. The base strip material may likewise provide additional electrical insulation, which is ensured by the fact that plastics with a high electric resistance can for example be processed at this location. At any rate, all these materials have in common the fact that the weight of the overlay strip per unit of area is usually less than 500 g/m$^2$ and in particular even less than 250 g/m$^2$.

As already explained, the overlay strip is designed according to the invention to be free of adhesive so it does not have an adhesive coating. In principle, of course coatings such as a lacquer coating are fundamentally conceivable. However, for reasons of cost, such coatings will be omitted in most cases, and the overlay strip will be designed not only to be free of adhesive coatings but would usually even be free of any coating at all.

Since the overlay strip is designed to be free of adhesive, it can be combined with the one (single) adhesive tape with the adhesive on one face to form the laminate with no problem and without any orientation difficulties. This requires only that the (single) adhesive tape in question must be applied with its first adhesive coating facing the overlay strip. Consequently, the overlay strip comes in contact with the first adhesive coating and, in the simplest case, is easily and thoroughly bonded to the adhesive tape in this procedure.

The second adhesive coating on the inner face of the base strip of the adhesive tape is such an adhesive coating that in the simplest case is applied to the inner face of the base strip in question with the help of a mask. The above-described partial-area coating with the additional second adhesive coating can therefore be implemented easily and with no problem. As an alternative to this, the second adhesive coating may also be done with a transfer tape and/or transfer film applied to the inner face of the adhesive tape with the help of this transfer tape or film.

The usual procedure in doing so will be to apply the adhesive tape with its first adhesive coating, defining a exposed edge band on its two longitudinal edges, to the overlay strip. In other words, according to an advantageous embodiment, not only is the first exposed edge band created but in addition another second exposed edge band is created namely one on each of the two longitudinal edges of the adhesive tape. The adhesive tape with its two longitudinal edges is therefore opposite the overlay strip, and the adhesive coating of the adhesive tape faces outward at the respective exposed edge bands. The two exposed edge bands may therefore be used in a particularly advantageous manner for fixation and securing of the sheath on the elongated object.

The first exposed edge band does in fact function in most cases as a fixation strip in this context, ensuring that the laminate is secured on the elongated object. On the other end, the second exposed edge band with the adhesive coating that is also exposed there and facing outward, functions mostly as a closure strip. In fact, the design is usually such that the outward facing adhesive coating of the closure strip comes in contact with the additional second adhesive coating at the end of the sheath operation, so that a particularly durable closure at the end is provided by engagement of the two first and second adhesive coatings.

The two exposed edge bands that are advantageously provided usually have different widths. In fact one observes at this location a width ratio of the two exposed edge bands and consequently of the fixation strip and/or the first exposed edge band in comparison with the closure strip and/or the second exposed edge band in the range of 1:1 to 1:5 and preferably in the range of 1:1 to 1:3.

Furthermore, the design is usually such that the adhesive tape as such has a width exceeding that of the overlay strip by the (total) width(s) of the exposed edge band(s). If only one exposed edge band of adhesive tape in comparison with the overlay strip is implemented, then the adhesive tape has a width that is equal to the sum of the width of the overlay strip and the width of the first exposed edge band. However, if two exposed edge bands are implemented, then the width of the adhesive tape is equal to the sum of the two widths of the two exposed edge bands plus the width of the overlay strip.

Since the adhesive tape is oriented at each of its two exposed edge bands with the adhesive coating facing outward so that these adhesive coatings are available for the adhesive bonding and the fixation strip, on the one hand, and the closure strip, on the other hand, can be made and used easily, as explained herebelow.

The second adhesive coating on the inner face of the base strip is generally not arranged centrally of the adhesive tape. The second adhesive coating is instead offset toward the first exposed edge band on the inner face of the base strip with respect to a central plane. This central plane of the adhesive tape is the plane of mirror symmetry for the adhesive tape that subdivides the adhesive tape provided with the adhesive coating on one face into two identical half-strips in its longitudinal extent. With respect to this central plane, the second adhesive coating on the inner face of the base strip is offset transversely toward the first exposed edge band.

This arrangement takes into account the fact that the first exposed edge band functions as a fixation strip and then the sheath is wrapped longitudinally around the elongated object. This results in a multilayer arrangement of the laminate that can be observed at least in the end region or the closure region of the longitudinal wrap where the offset is visible.

The second adhesive coating has a width corresponding approximately to the width of the second exposed edge band. Because the size ratios and/or width ratios of the first exposed edge band in relation to the second exposed edge band are in a range of 1:1 to 1:5, as described above, the second adhesive coating is provided with a width corresponding to that of the second exposed edge band and usually exceeding the width of the first exposed edge band. In particular, the width of the second exposed edge band and/or of the closure strip should correspond at least to the width of the second adhesive coating in order for make the desired secure closure of the sheath due to the mutual contact as described.

The exposed edge band itself has a width that is substantially less than the width of the adhesive tape. In fact the invention recommends in this context a design in which the exposed adhesive edge has a width amounting to 5% to 30% in comparison with the width of the adhesive tape. The width of the exposed edge band in comparison with width of the adhesive tape is preferably in the range of 10% to 20% of the width of the adhesive tape. This ensures that the adhesive tape with its one or two exposed edge bands together project by at most 30% of the tape's width.

With the sheath of the elongated object, the procedure usually followed is to align and secure the laminate with its first exposed edge band parallel to the elongated object. The first exposed edge band thus functions as a fixation strip. Then the laminate is wrapped around the object and, finally, is bonded to the second adhesive coating to form a longitudinally extending tubular sheath. Here, the second exposed edge band usually functions as a closure strip that sticks to the second adhesive coating as described, so that a particularly secure and long-lasting closure is seen at the end of the longitudinal sheath and/or the longitudinal wrap. The subject matter of the present invention is thus also a wrap strip that is particularly well suited for making a sheath for an elongated object.

As a result, a method of making a wrap strip for an elongated object and a corresponding sheath are described, both of which ensure a particular mechanical protection of the elongated object. In most cases, the elongated object here comprises one or more cable strands. Furthermore, the sheath and/or wrap is/are generally used in combination with cables in automobiles where the sheath ensures, on the whole, protection of the individual cable strands and/or cable sets from mechanical damage. Such damage may occur due to cutting and scouring in a motor vehicle, for example, and is controlled according to the present invention.

The procedure described here as well as the sheath can be made in a particularly simple and inexpensive manner. This is of special importance against the background of the enormous price competition in the automotive sector. This is where the main advantages are to be seen.

BRIEF DESCRIPTION OF THE DRAWING

The invention is described in greater detail below with reference to drawings showing a single illustrated embodiment, wherein FIGS. 1A to 1C show a method of making a wrap for an elongated object in various method steps, and FIG. 2 shows the sheath applied to the elongated object.

SPECIFIC DESCRIPTION OF THE INVENTION

The figures illustrate a wrap 1 for an elongated object 2. The elongated object 2 in this illustrated embodiment, which is not restrictive, includes several cable strands, cable sets, etc., that are combined for use in a motor vehicle. With the help of the sheath 1, the elongated object 2 and/or the individual strands is/are sheathed over their longitudinal extent. Consequently, the sheath 1 corresponds to a longitudinal wrap as a sheath, as shown in FIG. 2, and the production of which is illustrated in detail in FIGS. 1A to 1C, where one can see the sheath 1 and the individual production steps in a stretched-out state.

In production of the sheath 1, first an adhesive tape 3, 4 provided with an adhesive coating 3 is made available. The adhesive coating 3 covers a base strip 4 of the adhesive tape 3, 4 on its outer face essentially over the full area, as shown clearly in FIG. 1A. The adhesive tape 3, 4 has a width B as a whole.

The base strip 4 of the adhesive tape 3, 4 may be made of a woven or knit fabric. A PET (polyethylene terephthalate) woven fabric or a polyamide [nylon] woven fabric is used in most cases. In general, however, the base strip 4 may also be designed as a velour base strip or knit base strip. In general, the base strip 4 may be a textile base strip 4 that may basically be designed as a nonwoven.

The base strip 4 of the adhesive tape 3, 4 may also assume other functions in addition to its basic function of providing an application surface for the adhesive coating 3. It is thus conceivable for the base strip 4 to be provided with a lacquer coating, a film coating, etc. on its surface opposite the adhesive coating 3 in order to protect the cable strands sheathed in this way and/or the elongated object 2 from moisture, for example, splashed water after the sheath has been applied. In this context the base strip 4 may basically also be embodied as a film. The invention here is based on the fundamental discovery that, when the sheath 1 is applied to the elongated object 2, the surface of the adhesive tape 3, 4 opposite the adhesive coating 3 faces outward, and consequently, it can assume the additional function that has been described in a particularly advantageous manner.

Furthermore, the base strip 4 may function as a heat shield or thermal shield if the sheath 1 is to be applied in the area of hot engine parts, in particular for sheath cables in the engine space of a motor vehicle. In this case, the base strip 4 may be designed as a metal foil. However, it is also conceivable to furnish a textile base strip with a metal foil on its surface opposite the adhesive coating 3 to reflect thermal radiation in particular. Then the metal foil facing outward also functions as a heat shield at the same time.

The adhesive tape 3, 4 has a width B in the range of about 80 mm to 600 mm. The width B is preferably in the range of 80 mm to 300 mm. The weight of the adhesive tape 3, 4 per unit of area is in the range of 40 g/m$^2$ to 800 g/m$^2$ and preferably between 100 g/m$^2$ and 500 g/m$^2$. Its thickness may be in the range between 0.1 mm and 5 mm, preferably in the range between 0.2 mm and 1 mm.

The adhesive coating 3 is an adhesive compound based on natural or synthetic rubber. In most cases, an acrylate adhesive and in particular a hot-melt adhesive is used. Basically adhesive compounds based on silicone, polyurethane or polyether may also be used. The invention recommends values in the range between about 20 g/m² and 300 g/m² for the application weights of the adhesive coating 3.

The adhesive tape 3, 4 provided with the adhesive coating 3 on one face is combined with a overlay strip 5 to form a laminate 3, 4, 5. For this purpose, the one (single) adhesive tape 3, 4 is applied to the overlay strip 5 in the longitudinal extent, defining a first exposed edge band $U_1$ on at least one of its two longitudinal edges, as shown clearly in the transition from FIG. 1B to FIG. 1C.

In this operation, the overlay strip 5 that is formed without an adhesive coating, is bonded to the adhesive coating 3 of the adhesive tape 3, 4. This is done in such a way that the single adhesive tape 3, 4 that is coated on one face, is arranged on the outer face 5a of the overlay strip 5 in this example and/or is bonded to the outer face 5a. FIG. 1B then shows the inner face 5b of the overlay strip 5. At any rate, the overlay strip 5 is pressed with its outer face 5a directly on the adhesive coating 3 of the adhesive tape 3, 4 and then adheres to the adhesive coating 3.

After the overlay strip 5 has been combined with the adhesive tape 3, 4 to form the laminate 3, 4, 5, then according to the invention, the base strip 4 of the adhesive tape 3, 4 is provided with another second adhesive coating 7 on its inner face, i.e., on the face facing away from the overlay strip 5 and/or the adhesive coating 3. Thus, while the overlay strip 5 is provided and arranged on the outer face of the adhesive tape 3, 4, the second adhesive coating 7 is placed on the inner face of the adhesive tape 3, 4.

It can be seen here that the additional second adhesive coating 7—in addition to the first adhesive coating 3 on the adhesive tape 3, 4—is provided over only a portion of the area of the inner face of the adhesive tape 3, 4.

To implement this partial-area finishing of the inner face of the base strip 4 of the adhesive tape 3, 4 in detail, the adhesive used on this face can be applied by spraying it onto the inner face, taking into account a mask on the inner face of the base strip 4. In this illustrated embodiment, the additional second adhesive coating 7 is illustrated as being much thicker than the first adhesive coating 3. This deviation in the form of representation serves only to illustrate clearly the production process on the arrangement of the additional second adhesive coating 7. The two adhesive coatings 3, 7 are in fact usually applied to the base strip 4 with comparable application weights per unit of area and/or masses per unit of area. This application weight per unit of area and/or mass per unit of area is usually in the range of 30 g/m² to 300 g/m².

As an alternative to this, it is also possible for the adhesive coating 7 to be applied to a transfer film (not shown) and then applied to the inner face of the base strip 4 with the help of the transfer film. Other procedures for applying the adhesive coating 7 to the inner face of the base strip 4 are also covered by the invention, for example, a so-called "kiss coating" or a "curtain coating." In addition, the adhesive coating 7 can be applied to the inner face of the base strip 4 with the help of the spray coating method mentioned above.

In a topological sense, the design is such that, on the whole, the adhesive tape 3, 4 with its first adhesive coating 3 is applied to the overlay strip 5 in such way as to define a exposed edge band $U_1$, $U_2$ on its two longitudinal edges. In doing so, the orientation is such that the adhesive tape 3, 4 is aligned with the adhesive coating 3 facing outward at the two exposed edge bands $U_1$ and $U_2$. The first exposed edge band $U_1$ is the fixation strip already mentioned in the introduction. However, the second $U_2$ functions as a closure strip as will be explained in greater detail below.

On the basis of FIG. 1B in particular, one can see that the two exposed edge bands $U_1$ and $U_2$ there have approximately the same widths. In fact, however, the procedure here is usually such that a width ratio of 1:1 to 1:5 prevails between the exposed edge bands $U_1$ and $U_2$. In other words, the exposed edge band $U_1$ and/or the fixation strip corresponding to it is/are definitely narrower than the exposed edge band $U_2$ and the closure strip belonging to it.

Furthermore, the adhesive tape 3, 4 on the whole is provided with the width B mentioned above that exceeds the width C of the base strip 5 by an amount equal to the two exposed edge bands $U_1$, $U_2$. In other words, within the scope of this illustrated embodiment, the following equation holds:

$$B = C + U_1 + U_2.$$

On the basis of FIGS. 1B and 1C, it can be seen that the second adhesive coating 7 is offset toward the first exposed edge band $U_1$ on the inner face of the base strip 4 with respect to a central plane Z. This offset takes into account the fact that in applying the sheath according to the diagram in FIG. 2, the laminate 3, 4, 5 forms a sheath on the elongated object 2, taking into account more than one revolution, so that no uncovered areas of the elongated object 2 can be observed and the cables enclosed thereby are optimally protected from mechanical influences.

The second adhesive coating 7 has a width D that corresponds approximately to the width of the second exposed edge band $U_2$ and/or the closure strip and/or exceeds the width of the exposed edge band $U_2$ in question. The exposed edge band $U_1$, $U_2$ in turn has a width that is designed to be much smaller in comparison with the width B of the adhesive tape. In fact, widths of the exposed edge bands $U_1$, $U_2$ that are within the range of 5% to 30% of the width of the adhesive tape are observed here. In other words, the equation is $$U_1, U_2 \approx 0.05 \text{ to } 0.3B.$$

Due to the fact that the adhesive tape 3, 4 is oriented with the adhesive coating 3 facing outward on its two exposed edge bands $U_1$, $U_2$, the laminate 3, 4, 5 can be wrapped longitudinally around the elongated object 2 in a particularly simple manner. To this end, the laminate 3, 4, 5 is first secured with the adhesive coating 3 on the first exposed edge band $U_1$ and/or with the fixation strip on the elongated object 2.

The sheath is next wrapped longitudinally around the elongated object 2 according to the diagram in FIGS. 1C and/or 2. Finally, the additional second exposed edge band $U_2$, the fixation strip, is adhesively bonded to the longitudinal wrap produced in this way. In addition, the adhesive coating 3 on the second exposed edge band $U_2$ comes in contact with the second adhesive coating 7. In this way, a particularly intense bonding is observed because the two adhesive coatings 3, 7 are bonded to one another (cf. FIG. 2).

FIG. 2 shows how the sheath is wrapped around the elongated object 2, taking into account an almost double longitudinal wrap. This is of course not obligatory. In other words, the scope of the invention includes not only multiple sheaths, as shown here, but also the elongated object 2 may be provided with only a single sheath, for example. However, that is not shown in detail here.

It is obvious that different total widths of the laminate 3, 4, 5 and also different positions and sizes of the fixation strip and the closure strip can be implemented, depending on the variation in the widths B, C, D and the variation in the exposed edge bands $U_1$ and $U_2$. On the whole, total widths of the laminate 3, 4, 5 in the range of about 80 mm to 600 mm can be implemented, so that elongated objects 2 of widely varying diameters can be wrapped in this way. These are of course only examples and are nonrestrictive estimates.

We claim:

1. A sheath for making a wrap for an elongated object having an adhesive tape consisting of:
   a base strip having inner and outer faces and two longitudinal edges;
   a first adhesive coating on the outer face;
   an adhesive-free overlay strip adhered to the first adhesive coating so as to leave a first exposed edge band along on one of the two longitudinal edges of the tape; and
   a second adhesive coating covering only part of an area of the inner face.

2. The sheath defined in claim 1, wherein the first adhesive coating substantially completely covers the outer face.

3. The sheath defined in claim 1, wherein the overlay strip defines leaves on the outer face a second exposed edge band along the other of the longitudinal edges.

4. The sheath defined in claim 3, wherein the first and second exposed edge bands have a width ratio of 1:1 to 1:5.

5. The sheath defined in claim 3, wherein the second adhesive coating has a width corresponding approximately to a width of the second exposed edge band.

6. The sheath defined in claim 3, wherein the first adhesive coating is exposed outward by the overlay strip on the first and second exposed edge bands.

7. The sheath defined in claim 1, wherein the base strip has a width that exceeds a width of the overlay strip by at least a width of the first exposed edge band.

8. The sheath defined in claim 1, wherein the second adhesive coating is offset toward the first exposed edge band on the inner face of the base strip from a central longitudinally extending plane.

9. The sheath defined in claim 1, wherein the first exposed edge band has a width of 5% to 30% of a width of the base strip.

10. The sheath defined in claim 1, wherein the first and second adhesive coatings extend as strips along the respective faces.

* * * * *